United States Patent
De Man

(10) Patent No.: US 7,444,010 B2
(45) Date of Patent: Oct. 28, 2008

(54) METHOD AND APPARATUS FOR THE REDUCTION OF ARTIFACTS IN COMPUTED TOMOGRAPHY IMAGES

(75) Inventor: Bruno De Man, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 828 days.

(21) Appl. No.: 10/731,356

(22) Filed: Dec. 9, 2003

(65) Prior Publication Data
US 2005/0123215 A1 Jun. 9, 2005

(51) Int. Cl.
*G06K 9/00* (2006.01)
*G06K 9/40* (2006.01)
*A61B 6/00* (2006.01)
*G01N 23/00* (2006.01)
*G21K 1/12* (2006.01)
*H05G 1/60* (2006.01)

(52) U.S. Cl. .............................. 382/131; 382/275; 378/8

(58) Field of Classification Search ................. 382/131, 382/275; 378/8
See application file for complete search history.

(56) References Cited

U.S. PATENT DOCUMENTS

| 5,933,471 A | 8/1999 | Kalvin |
| 6,385,278 B1 * | 5/2002 | Hsieh ............................ 378/8 |
| 6,813,374 B1 * | 11/2004 | Karimi et al. ................ 382/131 |
| 2004/0001569 A1 * | 1/2004 | Luo ............................. 378/65 |

OTHER PUBLICATIONS

B. De. Man, "Iterative Reconstruction for Reduction of Metal Artifacts in Computed Tomography", PhD Thesis, University of Leuven, 2001.*

J.F. Williamson, et al, "Prospects for Quantitative Computed Tomography Imaging in the presence of Foreign Metal Bodies using Statistical Image Reconstruction", Med. Phys., vol. 29, No. 10, pp. 2404-2412

G. Wang, et al, "A fast algorithm for metal artifact reduction in X-ray CT", Academic Radiology, pp. 7:607-614, 2000.

W.A. Kalender, et al, "Reduction of CT Artifacts caused by Metallic Implants", Radiology, pp. 576-577, Aug. 1987.

August, Jonas et al.; "Fast Streaking Artifact Reduction in CT Using Constrained Optimization in metal Masks"; Robotics Institute, Carnegie Mellon University, Pittsburgh, PA; C. Berillot, D.R. Hynor, and P. Heller (Eds.): MICCAI 2004, LNCS 3217, pp. 1044-1045, 2004; © Springer-Verlag Berlin Heidelberg 2004.

* cited by examiner

*Primary Examiner*—Matthew C. Bella
*Assistant Examiner*—Randolph Chu
(74) *Attorney, Agent, or Firm*—Fletcher Yoder

(57) ABSTRACT

A method for reducing artifacts in image data generated by a computed tomography system is provided. The artifacts are due to the presence of a high density object in a subject of interest. Initially, measured sinogram data is received from the computed tomography system. The sinogram data is representative of a plurality of sinogram elements. The measured sinogram data is reconstructed to generate initial reconstructed image data. A trace of the high density object is identified in the measured sinogram data. Then a region of interest is identified in the initial reconstructed image data. An optimization criterion is identified based upon the region of interest. The sinogram elements in the trace of the high density object in the measured sinogram data is iteratively adjusted based upon the optimization criterion to generate corrected sinogram data. The corrected sinogram data is reconstructed to generate improved reconstructed image data.

17 Claims, 5 Drawing Sheets

METHOD AND APPARATUS FOR THE REDUCTION OF ARTIFACTS IN COMPUTED TOMOGRAPHY IMAGES

BACKGROUND OF THE INVENTION

The present invention generally relates to the field of image reconstruction in computed tomography (CT) systems and more particularly to a method and apparatus for reducing artifacts in image data generated by computed tomography systems.

CT scanners operate by projecting fan shaped or cone shaped x-ray beams through an object. The x-ray beams are generated by an x-ray source, and are generally collimated prior to passing through the object being scanned. The attenuated beams are then detected by a set of detector elements. The detector elements produce a signal based on the intensity of the attenuated x-ray beams, and the signals are processed to produce projections. By using reconstruction techniques, such as filtered backprojection, useful images are formed from these projections.

A computer is able to process and reconstruct images of the portions of the object responsible for the radiation attenuation. As will be appreciated by those skilled in the art, these images are computed by processing a series of angularly displaced projection images. This data is then reconstructed to produce the reconstructed image, which is typically displayed on a cathode ray tube, and may be printed or reproduced on film.

As CT scanners are developed with larger and larger detectors, they begin to encounter problems with artifacts in the reconstructed image that arise due to the cone angle of the scanner. An increase in the cone angle beyond a certain limit can result in a degradation of the image quality produced by the scanner. Another particular problem with reconstructed images in CT systems are artifacts caused by the presence of high density objects, for example, metal objects in a subject. The presence of such high density objects in a subject causes relatively high attenuation of the x-ray beams as they propagate through the subject, thereby resulting in a reconstructed image with artifacts. The artifacts may be due to one or more effects such as beam hardening, measurement noise, scatter, partial volume effect, aliasing, object motion and photon starvation.

Many techniques have been employed to reduce artifacts in image reconstructions. Some of these techniques include pre-processing of the sinogram data, modifying the reconstruction algorithm to reduce artifacts, or through post-processing of the reconstructed image. Pre-processing of the sinogram data comprises correcting for physical effects such as beam hardening, partial volume and scatter, or using adaptive filtering or projection completion techniques. Modifying the reconstruction algorithm comprises ignoring measurements through the high density objects using special image basis functions, incorporating the physics of the acquisition in the reconstructed algorithm, using lower weights for corrupted measurements or including prior information. Post-processing the reconstructed image typically comprises removing artifact streaks using pattern recognition or by applying reformats to avoid and average out the artifacts.

A disadvantage of the above techniques is that they result in either only a partial reduction of artifacts, introduce new artifacts, have a high computation time or result in the formation of blurred images. Therefore, there exists a need in the art for an improved technique for generating image data with reduced artifacts.

BRIEF DESCRIPTION OF THE INVENTION

In one embodiment, a method and computer readable medium for reducing artifacts in image data generated by a computed tomography system is described. The artifacts are due to the presence of a high density object in a subject of interest. Initially, measured sinogram data is received from the computed tomography system. The sinogram data is representative of a plurality of sinogram elements. The measured sinogram data is reconstructed to generate initial reconstructed image data. A trace of the high-density object is identified in the measured sinogram data. Then a region of interest is identified in the initial reconstructed image data. An optimization criterion is identified based upon the region of interest. The sinogram elements in the trace of the high density object in the measured sinogram data are iteratively adjusted based upon the optimization criterion, to generate corrected sinogram data. The corrected sinogram data is reconstructed to generate improved reconstructed image data.

In a second embodiment, a computed tomography system for reducing artifacts in image data is provided. The artifacts are due to the presence of a high density object in a subject of interest. The system comprises an x-ray source, a detector and a processor. The x-ray source is configured to project an x-ray beam from a plurality of positions through the subject of interest. The detector is configured to produce a plurality of electrical signals corresponding to the x-ray beam. The processor is configured to process the plurality of electrical signals to generate measured sinogram data. The sinogram data is representative of a plurality of sinogram elements. The processor is further configured to reconstruct the measured sinogram data to generate initial reconstructed image data, identify a trace of the high density object in the measured sinogram data; identify a region of interest in the initial reconstructed image data, identify an optimization criterion based upon the region of interest, iteratively adjust the sinogram elements in the trace of the high density object in the measured sinogram data based upon the optimization criterion, to generate corrected sinogram data and reconstruct the corrected sinogram data to generate improved reconstructed image data.

In a third embodiment, a method for reducing artifacts in image data generated by a computed tomography system is provided. The artifacts are due to the presence of objects in a subject of interest. Initially measured sinogram data is received from the computed tomography system. The sinogram data is representative of a plurality of sinogram elements. The measured sinogram data is reconstructed to generate initial reconstructed image data. A sinogram region of interest is identified in the measured sinogram data. An image region of interest is identified in the initial reconstructed image data. Then an optimization criterion is identified based upon the image region of interest. The sinogram region of interest is iteratively adjusted based upon the optimization criterion, to generate corrected sinogram data. Then the corrected sinogram data is reconstructed to generate improved reconstructed image data.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
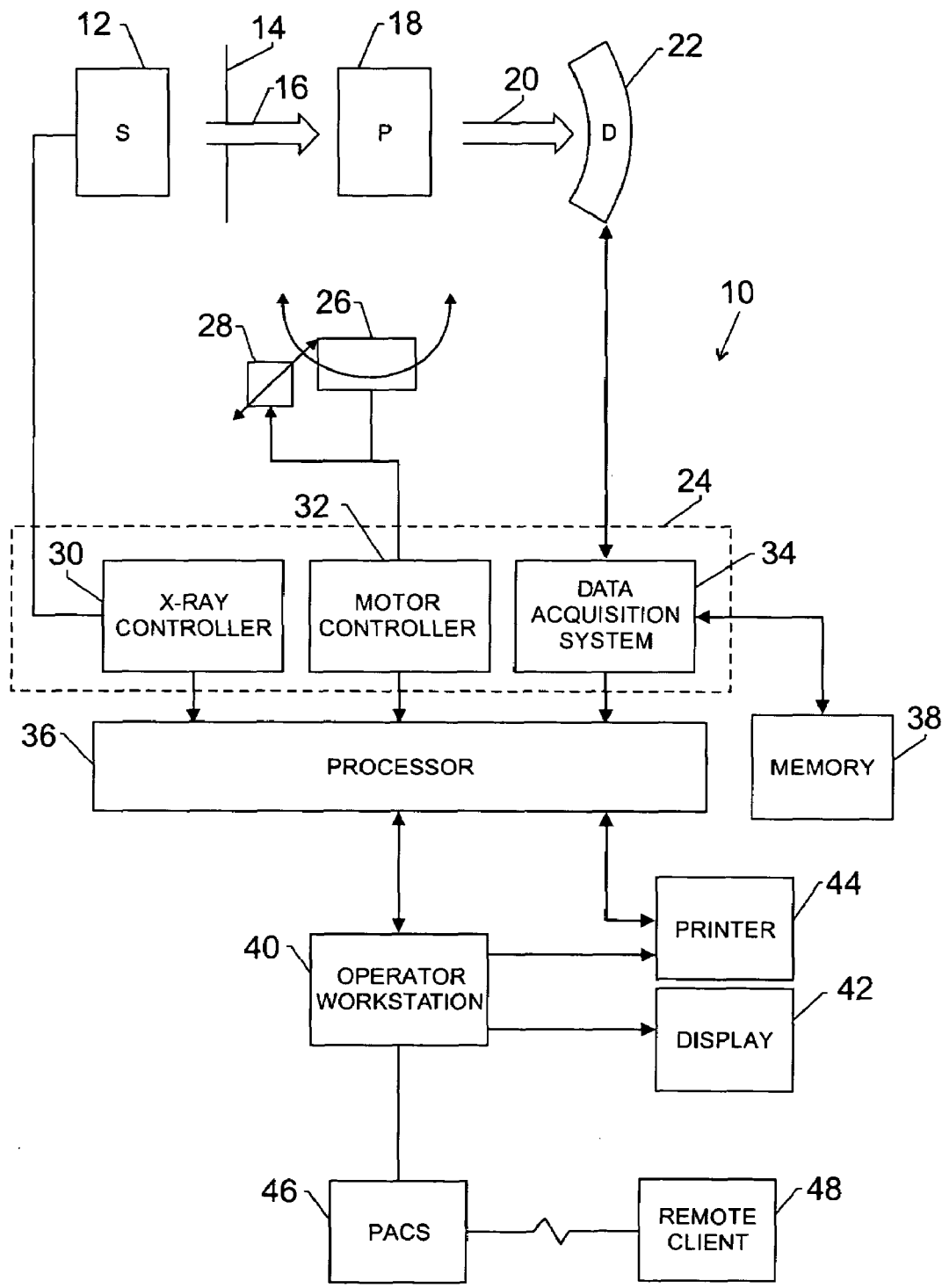
FIG. 1 is a diagrammatical view of an exemplary imaging system in the form of a CT imaging system for use in producing processed images in accordance with one embodiment of the present technique.

FIG. 1 illustrates diagrammatically an imaging system 10 for acquiring and processing image data. In the illustrated embodiment, system 10 is a computed tomography (CT) system designed both to acquire original image data, and to process the image data for display and analysis in accordance with the present technique. In the embodiment illustrated in FIG. 1, imaging system 10 includes a source of x-ray radiation 12 positioned adjacent to a collimator 14. In this exemplary embodiment, the source of x-ray radiation source 12 is typically an x-ray tube.

Collimator 14 permits a stream of radiation 16 to pass into a region in which an object, for example, a subject of interest 18 is positioned. A portion of the radiation 20 passes through or around the subject and impacts a detector array, represented generally at reference numeral 22. Detector elements of the array produce electrical signals that represent the intensity of the incident x-ray beam. These signals are acquired and processed to reconstruct images of the features within the subject 18.

Source 12 is controlled by a system controller 24, which furnishes both power, and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a rotational subsystem 26 and a linear positioning subsystem 28. The rotational subsystem 26 enables the x-ray source 12, collimator 14 and the detector 22 to be rotated one or multiple turns around the subject 18. It should be noted that the rotational subsystem 26 might include a gantry. Thus, the system controller 24 may be utilized to operate the gantry. The linear positioning subsystem 28 enables the subject 18, or more specifically a table, to be displaced linearly. Thus, the table may be linearly moved within the gantry to generate images of particular areas of the subject 18.

Additionally, as will be appreciated by those skilled in the art, the source of radiation may be controlled by an x-ray controller 30 disposed within the system controller 24. Particularly, the x-ray controller 30 is configured to provide power and timing signals to the x-ray source 12. A motor controller 32 may be utilized to control the movement of the rotational subsystem 26 and the linear positioning subsystem 28.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a processor 36.

The processor 36 is typically coupled to the system controller 24. The data collected by the data acquisition system 34 may be transmitted to the processor 36 and moreover, to a memory 38. It should be understood that any type of memory to store a large amount of data might be utilized by such an exemplary system 10. Moreover, the memory 38 may be located at this acquisition system or may include remote components for storing data, processing parameters, and routines described below. Also the processor 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from processor 36, initiate imaging, and so forth.

A display 42 coupled to the operator workstation 40 may be utilized to observe the reconstructed image and to control imaging. Additionally, the scanned image may also be printed by a printer 44 which may be coupled to the operator workstation 40. The display 42 and printer 44 may also be connected to the processor 36, either directly or via the operator workstation 40. Further, the operator workstation 40 may also be coupled to a picture archiving and communications system (PACS) 46. It should be noted that PACS 46 might be coupled to a remote system 48, radiology department information system (RIS), hospital information system (HIS) or to an internal or external network, so that others at different locations may gain access to the image and to the image data.

It should be further noted that the processor 36 and operator workstation 40 may be coupled to other output devices, which may include standard, or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
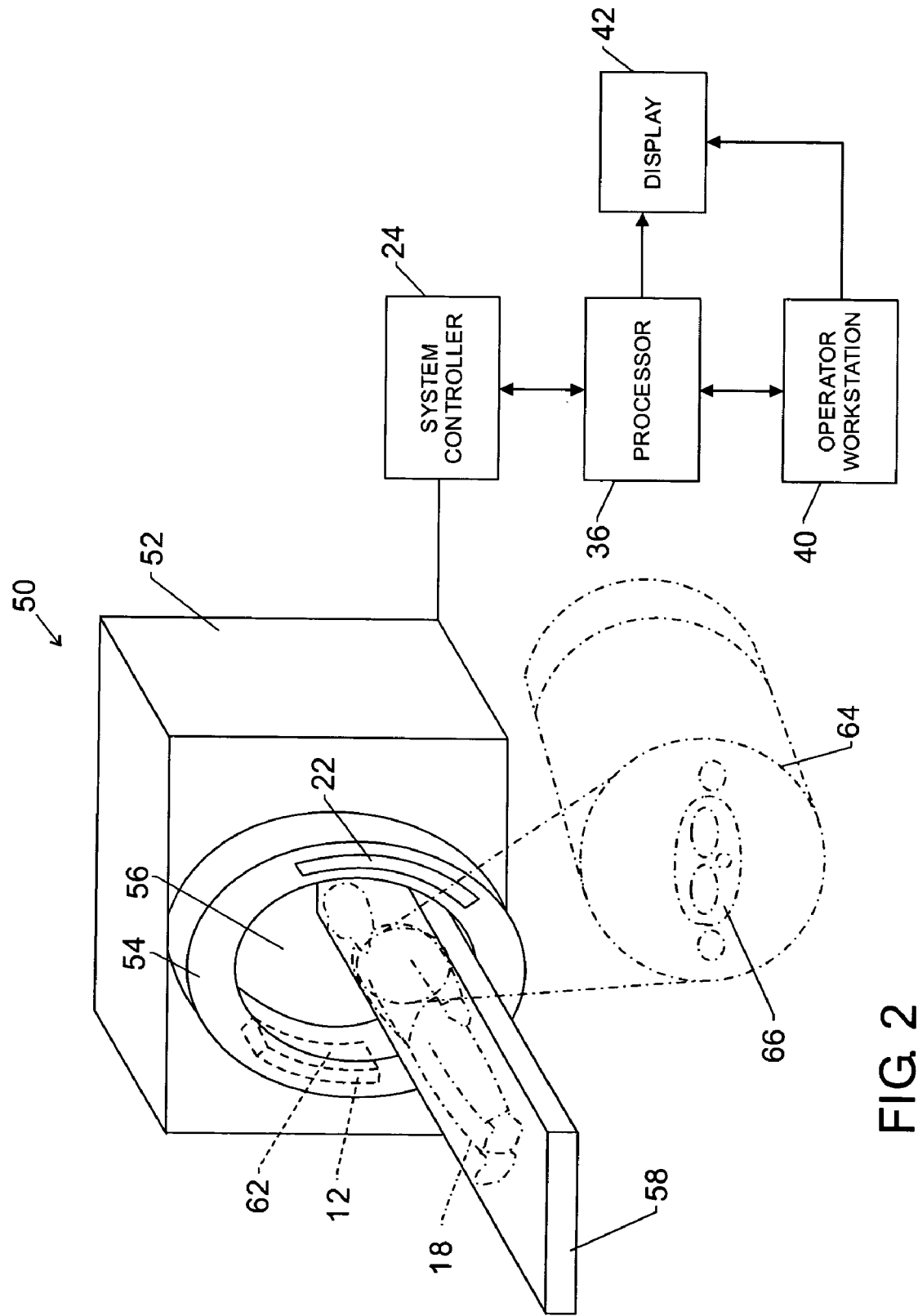
FIG. 2 is another diagrammatical view of a physical implementation of the CT system of FIG. 1.

Referring generally to FIG. 2, an exemplary imaging system utilized in a present embodiment may be a CT scanning system 50. The CT scanning system 50 is typically a multi-slice detector CT (MDCT) system that offers a wide array of axial coverage, high gantry rotational speed, and high spatial resolution. The CT scanning system 50 is illustrated with a frame 52 and a gantry 54 that has an aperture 56. The aperture 56 may typically be 50 cm in diameter. Further, a table 58 is illustrated positioned in the aperture 56 of the frame 52 and the gantry 54. Additionally, the table 58 is configured to be displaced linearly by the linear positioning subsystem 28 (see FIG. 1). The gantry 54 is illustrated with the source of radiation 12, typically an x-ray tube that emits x-ray radiation from a focal point 62. In typical operation, x-ray source 12 projects an x-ray beam from the focal point 62 toward detector array 22. The detector 22 is generally formed by a plurality of detector elements, which sense the x-ray beams that pass through and around a subject of interest. Each detector element produces an electrical signal that represents the intensity of the x-ray beam at the position of the element at the time the beam strikes the detector. Furthermore, the gantry 54 is rotated around the subject of interest so that a plurality of radiographic views may be collected by the processor 36. Thus, an image or slice is computed which may incorporate, in certain modes, less or more than 360 degrees of projection data, to formulate an image. The image is collimated to desired dimensions, using either lead shutters in front of the x-ray source 12 and different detector apertures. The collimator 14 (see FIG. 1) typically defines the size and shape of the x-ray beam that emerges from the x-ray source 12. Thus, as the x-ray source 12 and the detector 22 rotate, the detector 22 collects data of the attenuated x-ray beams.

Data collected from the detector 22 then undergoes pre-processing and calibration to condition the data to represent the line integrals of the attenuation coefficients of the scanned objects. The processed data, commonly called projections, are then filtered and backprojected to formulate an image of the scanned area. As mentioned above, the processor 36 is typically used to control the entire CT system 10. The main processor that controls the operation of the system may be adapted to control features enabled by the system controller 24. Further, the operator workstation 40 is coupled to the processor 36 as well as to a display, so that the reconstructed image may be viewed.

Alternatively, some or all of the processing described herein may be performed remotely by additional computing resources based upon raw or partially processed image data. In accordance with the present technique, the processor is configured to generate improved reconstructed image data using the technique as described in subsequent paragraphs.

While in the present discussion reference is made to a CT scanning system in which a source and detector rotate on a gantry arrangement, it should be borne in mind that the present technique is not limited to data collected on any particular type of scanner. For example, the technique may be applied to data collected via a scanner in which an x-ray source and a detector are effectively stationary and an object is rotated, or in which the detector is stationary but an x-ray source rotates. Further, the data could originate in a scanner in which both the x-ray source and detector are stationary, as where the x-ray source is distributed and can generate x-rays at different locations. Similarly, while generally circular scan geometries are discussed, other geometries may be envisioned as well. Once reconstructed, the image produced by the system of FIGS. 1 and 2 reveals internal features of an object. As illustrated generally in FIG. 2, the image 64 may be displayed to show these features, such as indicated at reference numeral 66 in FIG. 2. Further, the present technique could apply to three-dimensional or cone beam acquisitions as well as to two-dimensional acquisitions.

Figure 3:
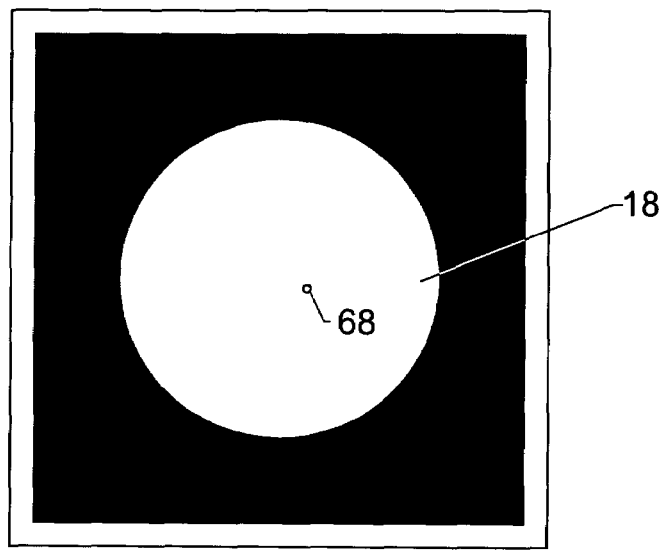
FIG. 3 is an illustration of a high density object in a subject in accordance with the present technique.

FIG. 3 is an illustration of a high density object in a subject of interest in accordance with the present technique. As shown in FIG. 3, reference numeral 18 represents the subject of interest, for example a patient and reference numeral 68 represents a high density object, for example a metal object. The presence of such high density objects in the subject 18 causes the appearance of artifacts in the reconstructed image. High density objects could include for example dental fillings, prosthetic devices or surgical clips in the subject of interest 18. That is, the presence of high density objects causes strong attenuation of the x-ray beams as they are projected through the subject, thereby resulting in a reconstructed image with metal streak artifacts, that are generally visible as bright and dark streaks or bands in the reconstructed image.

Figure 4:
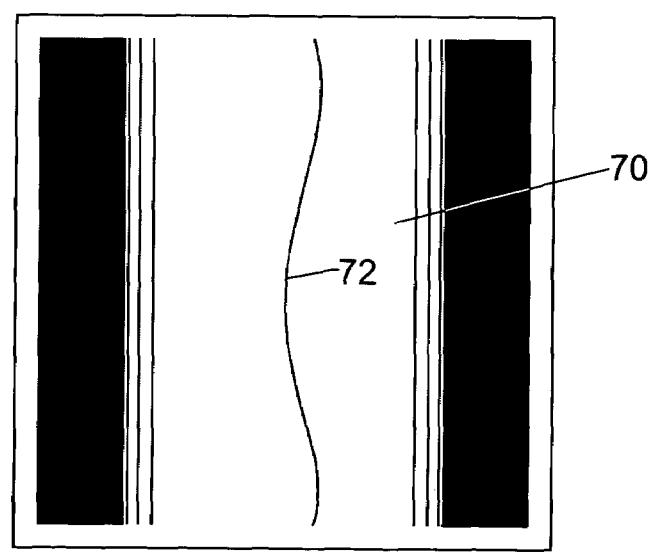
FIG. 4 is a representation of data collected by the data acquisition system of FIG. 1, presented as a sinogram, in accordance with the present technique.

FIG. 4 is a representation of the data collected by the data acquisition system 34 of FIG. 1 presented as a sinogram, 70, in accordance with the present technique. As will be appreciated by those skilled in the art, a sinogram is a collection of output data from the detector array 22 resulting from radiation traversing the subject of interest 18 at a given source position. The output data from each source and detector position or view corresponds to a row of projection data in the sinogram 70. As used herein, the term projection data is sometimes referred to as measured sinogram data. The measured sinogram data is representative of a plurality of sinogram elements. Thus, as illustrated in FIG. 4, each row of the sinogram 70 constitutes a projection view that is indicative of the attenuation information for a distinct view angle, for given source and detector positions, with respect to the subject 18. As described in greater detail below, these projection views are then processed to generate reconstructed image data (cross-sectional images) of the subject 18 at the given position.

Referring again to FIG. 4, reference numeral 72 indicates measured sinogram data affected by the presence of the high density object 68 in a plurality of view angles. As will be appreciated by those skilled in the art, except for objects lying at the center of the CT system 10, all objects will appear in the sinogram 70 as a sine-like wave, whose position corresponds to their location in the subject of interest. That is, the location of particular data resulting from attenuation by the presence of a high density object may appear as a distinguishable sinusoidal trace 72. The high attenuation and the associated physical side effects cause errors in the measured sinogram data and this results in the presence of streaks in the reconstructed image data as described in greater detail below.

Figure 5:
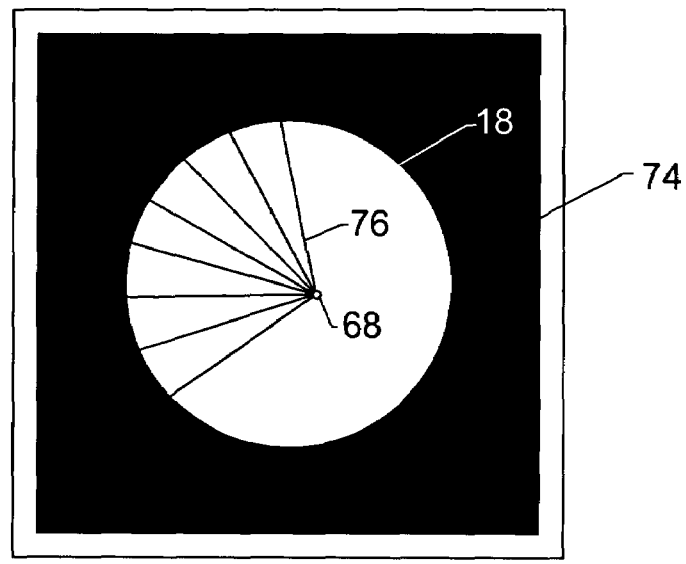
FIG. 5 is an illustration of reconstructed image data in accordance with the present technique.

FIG. 5 is an illustration of reconstructed image data 74 in accordance with the present technique. The measured sinogram data, comprising the sinogram 70 as illustrated in FIG. 4 is reconstructed to generate the reconstructed image data. Various image reconstruction techniques are available and may be used in the present technique to generate initial reconstructed image data. In a present embodiment, a filtered backprojection technique is used to generate the initial reconstructed image data. As will be appreciated by those skilled in the art, a filtered backprojection technique generally comprises the steps of weighting, filtering and backprojection of data of the measured sinogram data. The weighting of the sinogram data may be performed with a point-by-point multiplication by a pre-calculated 2D array. The filtering or convolution step filters the sinogram data to de correlate them and may be carried out as a series of one-dimensional convolutions. In the backprojection step, the measured sinogram data is added to all picture elements in an image along the projection lines of the original projection views.

Referring again to FIG. 5, reference numeral 68 represents the high density object in the initial reconstructed image data. The presence of the high density object 68 in the subject 18 causes artifacts to appear in the initial reconstructed image data. As described above, the high density object may comprise metal objects such as, for example, dental fillings, prosthetic devices or surgical clips in the subject 18. These high density objects strongly attenuate all or part of the x-ray beam incident on the detector 22. The strong attenuation introduces or enhances a number of effects such as noise, beam hardening, scatter, partial volume and aliasing causing the attenuation measurements to be incorrect. Errors in the attenuation measurements result in artifacts that appear as streaks or lines through the reconstructed image data as illustrated by the reference numeral 76.

Figure 6:
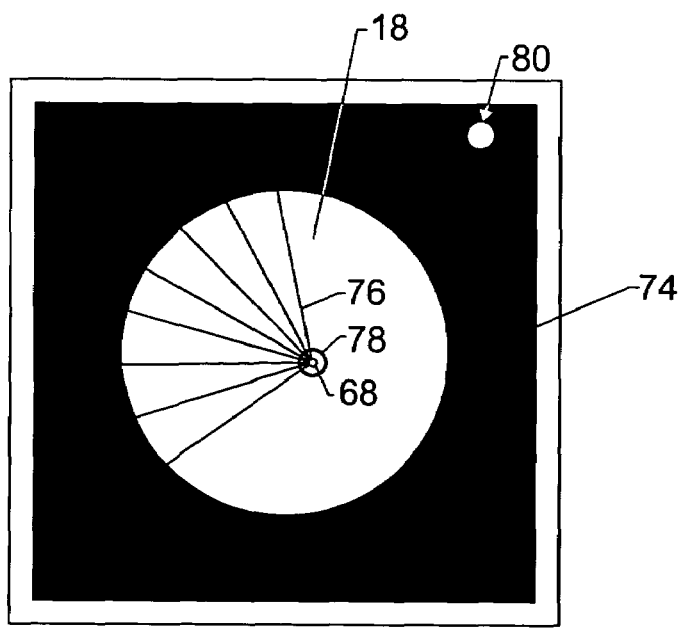
FIG. 6 is an illustration of an exemplary reconstructed image data and a particular region of interest used in eliminating artifacts due to the presence of a high density object in accordance with the present technique.

FIG. 6 is an illustration of an exemplary reconstructed image data and two particular regions of interest used in eliminating artifacts due to the presence of a high density object in accordance with the present technique. The region of interest as depicted by the reference numeral 78 is shown as surrounding the high density object. As also indicated in FIG. 6, reference numeral 80 indicates another region of interest outside the subject of interest. This is a region of interest with a known attenuation value. As used herein, the term region of interest refers to a region in the reconstructed image data that can be used for reference purposes in modifying the measured sinogram data to eliminate artifacts resulting from the presence of high density objects. In accordance with the present technique, the regions of interest are selected based on specific criteria as will be described in the subsequent paragraphs.

Figure 7:
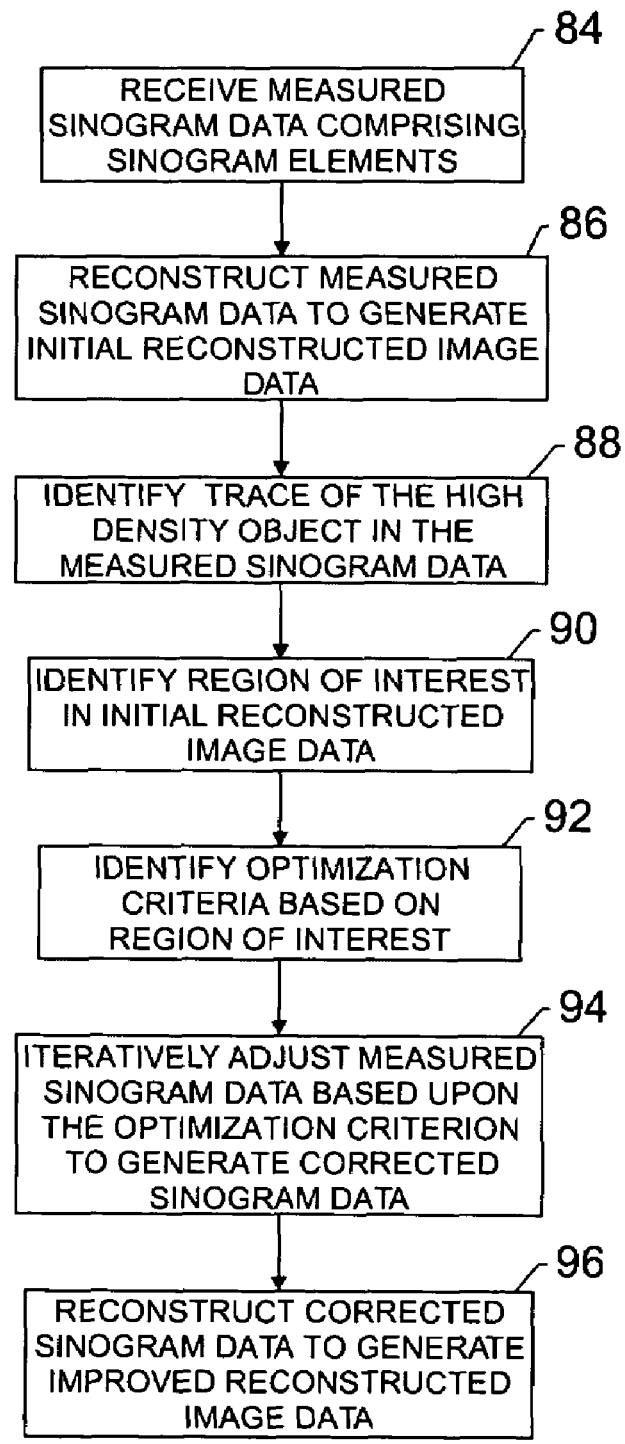
FIG. 7 is a flowchart illustrating the steps performed for reducing artifacts in image data generated by the CT system of FIG. 1 in accordance with the present technique.

FIG. 7 is a flowchart illustrating the steps performed for reducing artifacts in image data generated by the CT system of FIG. 1 in accordance with the present technique. In step 84, measured sinogram data from the computed tomography system is received. As discussed above, the sinogram data is representative of a plurality of sinogram elements. In step 86, the measured sinogram data is reconstructed to generate initial reconstructed image data. As described above, the initial reconstructed image data is generated using the filtered back projection technique presenting accordance with the present technique.

In step 88, a trace of the high density object is identified in the measured sinogram data. As used herein, the "trace" refers to a shadow area or region in the measured sinogram data that is attenuated by the high density object 68. In one embodiment, identifying the trace of the high density object comprises segmenting the high density object from the initial reconstructed image data, reprojecting the segmented high density object from the initial reconstructed image data, and assigning a reliability measure to each sinogram element in the measured sinogram data relative to its position within the trace of the segmented high density object. In an alternate embodiment, identifying the trace of the high density object comprises assigning a reliability measure to each sinogram element in the measured sinogram data based on a pre-defined threshold value. The pre-defined threshold value may be selected based upon a number of factors such as size, shape and density of the subject, and size, shape and density of the high-density objects. In yet another embodiment, identifying the trace of the high density object comprises assigning a reliability measure to each sinogram element in the measured sinogram data based on an attenuation value of each sinogram element. As used herein, the reliability measure generally corresponds to the degree of allowable adjustment to the sinogram elements in the measured sinogram data.

In step 90, a region of interest is identified in the initial reconstructed image data. The regions of interest could include regions surrounding, but not including the high density object, regions outside the high density object, but within the subject of interest or regions outside the subject of interest. The identified region of interest serves as a reference region to refine the sinogram elements in the trace of the high density object as will be described in greater detail below. In one embodiment, the region of interest is identified based on an attenuation value associated with the region of interest. As used herein, the term attenuation value is a value that corresponds to the level of attenuation of the radiation caused by portions of the subject traversed by the x-ray beam. In another embodiment, the region of interest is identified based on a uniformity value associated with the region of interest. As used herein, the term uniformity value refers to the relative variation between intensity values of data comprising the reconstructed image data. In yet another embodiment, the region of interest is identified based on the relative position of the region of interest with respect to the high density object.

In step 92, an optimization criterion is identified based upon the region of interest identified in step 90. As used herein, the term optimization criterion refers generally to an objective function, such as for providing a measure of the reduction of artifacts in the region of interest. In one embodiment, the optimization criterion comprises determining how close the image pixel values within the region of interest are to an optimal attenuation value associated with the region of interest. The optimal attenuation value may generally be considered to be a known attenuation value of a known portion of the subject. In another embodiment, the optimization criterion comprises determining a uniformity value associated with the region of interest. The optimal uniformity value may generally be considered to be achieved when the region of interest is uniform. In yet another embodiment, the optimization criterion comprises minimizing angular variations associated with the region of interest based on the relative position of the region of interest with respect to the high density object. In the present context, minimizing angular variations may generally thought of as removing concentric streaks from the region of interest. As is apparent from the above discussion, identifying an optimization criterion helps in minimizing the streak artifacts in the region of interest by iteratively adjusting the sinogram elements in the trace of the high density object in the measured sinogram data. Given that the trace of the high density object usually includes only a small fraction of the measured sinogram data and given that the regions of interest usually include only a small fraction of the image data, this iterative correction can be attained in relatively small computation time.

In step 94, the sinogram elements in the trace of the high density object in the measured sinogram data is iteratively adjusted based upon the optimization criterion defined in step 92, to generate corrected sinogram data. In a present embodiment, iteratively adjusting the measured sinogram data is based upon the reliability measure assigned to each sinogram element in the measured sinogram data, wherein the sinogram elements are adjusted in proportion to their reliability measure.

Finally, in step 96, the corrected sinogram data generated in step 94 is reconstructed to generate improved reconstructed image data. In a specific embodiment, reconstructing the corrected sinogram data to generate improved reconstructed image data comprises using a filtered back projection technique as described above.

The embodiments described above have several advantages compared to existing artifact reduction algorithms, including a reduction in the appearance of new streaks in the reconstructed image and decrease in computation time required to generate the reconstructed image. The present technique achieves the above advantages by iterative adjustment of the measured sinogram data based upon the optimization criterion, wherein the adjustment is based on a reliability measure associated with each sinogram element and wherein defining the optimization criterion enables the identified region of interest in the initial reconstructed image data to attain specific attenuation values, or uniform attenuation values or have minimum angular variations. The resulting corrected sinogram data, when reconstructed, results in improved reconstructed image data with reduced artifacts.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, while reference is made herein to the removal of artifacts due to the presence of high density objects, the present technique may also be employed more generally for the removal of artifacts due to various types of objects. These objects may include, for example, objects moving or movable within the subject being imaged.

What is claimed is:

1. A method for reducing artifacts in image data generated by a computed tomography system, the artifacts being due to the presence of a high density object in a subject of interest, the method comprising:
    receiving measured sinogram data from the computed tomography system, the sinogram data representative of a plurality of measured sinogram elements;
    reconstructing the measured sinogram data to generate initial reconstructed image data;
    identifying a trace of the high density object in the measured sinogram data;
    identifying a region of interest in the initial reconstructed image data;
    identifying an optimization criterion based upon the region of interest, in an image domain;
    iteratively adjusting the measured sinogram elements at least in the trace of the high density object in the measured sinogram data based upon the optimization criterion in the image domain, to generate corrected sinogram data; and
    reconstructing the corrected sinogram data to generate improved reconstructed image data.

2. The method of claim 1, wherein the initial reconstructed image data is generated using a filtered back projection technique.

3. The method of claim 1 further comprising assigning a reliability measure to each sinogram element, and wherein iteratively adjusting the measured sinogram data is based upon the reliability measure.

4. The method of claim 3, wherein identifying a trace of the high density object further comprises:
    segmenting the high density object from the initial reconstructed image data;
    reprojecting the segmented high density object from the initial reconstructed image data; and
    assigning the reliability measure to each sinogram element in the measured sinogram data relative to its position within the trace of the segmented high density object.

5. The method of claim 3, wherein identifying the trace of the high density object further comprises assigning the reliability measure to each sinogram element in the measured sinogram data based on a pre-defined threshold value.

6. The method of claim 3, wherein identifying the trace of the high density object further comprises assigning the reliability measure to each sinogram element in the measured sinogram data based on an attenuation value of each sinogram element.

7. The method of claim 1, wherein identifying a region of interest is based on an attenuation value associated with the region of interest.

8. The method of claim 1, wherein identifying a region of interest is based on a uniformity value associated with the region of interest.

9. The method of claim 1, wherein identifying a region of interest is based on the relative position of the region of interest with respect to the high density object.

10. The method of claim 1, wherein the optimization criterion comprises determining an optimal attenuation value associated with the region of interest.

11. The method of claim 1, wherein the optimization criterion comprises determining an optimal uniformity value associated with the region of interest.

12. The method of claim 1, wherein the optimization criterion comprises minimizing angular variations associated with the region of interest based on the relative position of the region of interest with respect to the high density object.

13. The method of claim 1, wherein reconstructing the corrected sinogram data to generate improved reconstructed image data comprises using a filtered back projection technique.

14. A computed tomography system for reducing artifacts in image data, the artifacts being due to the presence of a high density object in a subject of interest, the system comprising:
    an x-ray source configured to project an x-ray beam from a plurality of positions through the subject of interest;
    a detector configured to produce a plurality of electrical signals corresponding to the x-ray beam; and
    a processor configured to process the plurality of electrical signals to generate measured sinogram data, the sinogram data representative of a plurality of measured sinogram elements, wherein the processor is further configured to reconstruct the measured sinogram data to generate initial reconstructed image data; identify a trace of the high density object in the measured sinogram data; identify a region of interest in the initial reconstructed image data; identify an optimization criterion based upon the region of interest, in an image domain; iteratively adjust the measured sinogram elements at least in the trace of the high density object in the measured sinogram based upon the optimization criterion in the image domain, to generate corrected sinogram data; and reconstruct the corrected sinogram data to generate improved reconstructed image data.

15. At least one computer-readable medium storing computer instructions for instructing a computer system to reduce artifacts in image data generated by a computed tomography system, the artifacts being due to the presence of a high density object in a subject of interest, the computer instructions comprising:
    receiving measured sinogram data from the computed tomography system, the sinogram data representative of a plurality of measured sinogram elements;
    reconstructing the measured sinogram data to generate initial reconstructed image data;

identifying a trace of the high density object in the measured sinogram data;

identifying a region of interest in the initial reconstructed image data;

identifying an optimization criterion based upon the region of interest, in an image domain;

iteratively adjusting the measured sinogram elements at least in the trace of the high density object in the measured sinogram data based upon the optimization criterion in the image domain, to generate corrected sinogram data; and reconstructing the corrected sinogram data to generate improved reconstructed image data.

16. A computed tomography system for reducing artifacts in image data, the artifacts being due to the presence of a high density object in a subject of interest, the system comprising:

means for processing a plurality of electrical signals corresponding to an x-ray beam generated by the computed tomography system to generate measured sinogram data, the sinogram data representative of a plurality of measured sinogram elements, wherein the processing further comprises reconstructing the measured sinogram data to generate initial reconstructed image data; identify a trace of the high density object in the measured sinogram data; identify a region of interest in the initial reconstructed image data; identify an optimization criterion based upon the region of interest, in an image domain; iteratively adjust the measured sinogram elements at least in the trace of the high density object in the measured sinogram data based upon the optimization criterion in the image domain, to generate corrected sinogram data; and reconstruct the corrected sinogram data to generate improved reconstructed image data.

17. A method for reducing artifacts in image data generated by a computed tomography system, the artifacts being due to the presence of objects in a subject of interest, the method comprising:

receiving measured sinogram data from the computed tomography system, the sinogram data representative of a plurality of measured sinogram elements;

reconstructing the measured sinogram data to generate initial reconstructed image data;

identifying a sinogram region of interest in the measured sinogram data;

identifying an image region of interest in the initial reconstructed image data;

identifying an optimization criterion based upon the image region of interest, in an image domain;

iteratively adjusting the measured sinogram elements in at least the sinogram region of interest based upon the optimization criterion in the image domain, to generate corrected sinogram data; and reconstructing the corrected sinogram data to generate improved reconstructed image data.

* * * * *